United States Patent
Kouno et al.

(10) Patent No.: US 6,871,128 B2
(45) Date of Patent: Mar. 22, 2005

(54) SPEED CHANGE CONTROL METHOD AND SPEED CHANGE CONTROLLER

(75) Inventors: Yukinobu Kouno, Inami-cho (JP); Masaaki Uenishi, Kobe (JP); Kenichi Nakashima, Kobe (JP); Tatsuhiko Goi, Kobe (JP); Koji Kawakami, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 180 days.

(21) Appl. No.: 10/121,690

(22) Filed: Apr. 15, 2002

(65) Prior Publication Data

US 2002/0173403 A1 Nov. 21, 2002

(30) Foreign Application Priority Data

Apr. 19, 2001 (JP) .......................... 2001-121716

(51) Int. Cl.$^7$ .............................. G06F 19/00; G06F 7/00
(52) U.S. Cl. ........................... 701/51; 701/52; 475/198; 477/37; 477/35; 192/3.51; 192/3.54; 74/336
(58) Field of Search ................. 701/51, 52; 475/198; 477/37, 107, 35; 192/3.51, 3.54; 476/67; 76/336

(56) References Cited

U.S. PATENT DOCUMENTS

| 5,683,326 A | * | 11/1997 | Inoue ........................ 476/10 |
| 5,823,052 A | * | 10/1998 | Nobumoto .................... 74/335 |
| 6,045,481 A | * | 4/2000 | Kumagai ..................... 477/37 |
| 6,217,477 B1 | * | 4/2001 | Nobumoto et al. ........... 477/43 |
| 2002/0086764 A1 | * | 7/2002 | Ooyama ..................... 475/214 |

FOREIGN PATENT DOCUMENTS

| JP | 08-270771 | 10/1996 |
| JP | B2 2568684 | 10/1996 |
| JP | A 2000-257686 | 9/2000 |
| JP | A 2001-265406 | 9/2001 |

* cited by examiner

*Primary Examiner*—Thomas G. Black
*Assistant Examiner*—Ronnie Mancho
(74) *Attorney, Agent, or Firm*—Oliff & Berridge PLC

(57) ABSTRACT

A speed change control method of controlling a speed change ratio of a continuously variable transmission mechanism including a traction continuously variable transmission, includes: estimating a tilt angle of a power roller included in the continuously variable transmission based on an input rotating speed and an output rotating speed of the continuously-variable transmission mechanism;

estimating a position of the power roller based on an estimated tilt angle obtained by the tilt angle estimating step and a command signal given to a driving device of adjusting the tilt angle of the power roller; and executing a feedback control operation based on an estimated position of the power roller obtained by the position estimating step.

12 Claims, 10 Drawing Sheets

SPEED CHANGE CONTROL METHOD AND SPEED CHANGE CONTROLLER

BACKGROUND OF THE INVENTION

1. Field of the Invention

The present invention relates to a speed change control method and a speed change controller. More specifically, the present invention relates to a speed change control method and a speed change controller for accurately controlling the output speed of an automotive or airborne traction-drive continuously variable transmission for an automobile, an aircraft, etc.

2. Description of the Related Art

A toroidal continuously variable transmission, which uses the inner circumference of a toroidal member as a friction surface, is one of traction-drive continuously variable transmissions (hereinafter referred to simply as "traction continuously variable transmissions" when necessary) for transmitting comparatively large power. In the toroidal continuously variable transmission, the tilt angle of a power roller rotating in contact with the respective friction surfaces of an input disk and an output disk is adjusted for the continuously variable control of speed change ratio.

Generally, a method of controlling the tilt angle of the power roller measures the tilt angle of the power roller or a parameter representing the tilt angle of the power roller and adjusts the tilt angle of the power roller by a local feedback control to improve control characteristic of speed change ratio control of such a toroidal continuously variable transmission, instead of measuring only output rotating speed and adjusting the tilt angle of the power roller.

FIG. 9 is a diagrammatic view showing the basic idea of a conventional speed change control.

Suppose that a power generating system 100 converts the rotative output 101 of an aircraft engine into a rotative driving force 104 of a fixed rotating speed by a continuously variable transmission mechanism 103 including a toroidal continuously variable transmission 102, and drives a generator 105 by the rotative driving force 104 to produce an alternate current of a predetermined frequency. The power generating system 100 employs a hydraulic cylinder actuator 111 as an actuator for adjusting the tilt angle of a power roller 110 included in the toroidal continuously variable transmission 102. The hydraulic cylinder actuator 111 shifts the position of the axis of rotation of the power roller 110 (hereinafter referred to as "power roller position") to adjust the tilt angle of the power roller 110.

A control system controls the continuously-variable transmission mechanism 103. The control system includes a subtractor 109 which subtracts a measured rotating speed 107 of the output shaft that provides the rotative driving force 104 of the toroidal continuously variable transmission 102 from a desired rotating speed 106 of the output shaft of the toroidal continuously variable transmission 102 to obtain a rotating speed difference 108, a rotating speed controller 113 which generates a desired power roller position 112 specifying a power roller position for reducing the rotating speed difference 108 to zero, and a tilt angle control loop 114 which controls the tilt angle of the power roller 110 in a feedback control mode to make a measured power roller position 115 coincide with the desired power roller position 112.

The tilt angle control loop 114 includes a position subtractor 117 which subtracts the measured power roller position 115 from the desired power roller position 112 to provide a power roller position difference 116, and a position controller 119 which generates a desired valve opening signal 118 indicating a desired opening of a flow control valve, not shown, for controlling the flow of a working fluid into the hydraulic cylinder actuator 111.

Thus, the tilt angle control loop 114, i.e., a local feedback control loop, of the power generating system 100 controls the tilt angle of the power roller 110 on the basis of the measured power roller position 115 to control speed change ratio.

FIG. 10 shows a mechanism 200 proposed in Japanese Pat. No. 2568684 including a local feedback control system.

The control mechanism 200 measures a tilt angle change $\phi_g$ in the tilt angle of a power roller 201 mechanically by a precession cam, and changes power roller position to control the tilt angle of the power roller 201 in a feedback control mode. The control mechanism 200 includes a hydraulic cylinder actuator 202 for changing the power roller position, a flow control valve mechanism 203 for regulating the flow of a working fluid into the hydraulic cylinder actuator 202, and a tilt angle change measuring mechanism 204 for measuring the tilt angle change $\phi_g$ mechanically and adjusting the valve opening of the flow control valve mechanism 203.

The flow control valve mechanism 203 includes a sleeve 206 driven for axial displacement by a speed change motor 205, a spool 208 fitted in the bore of the sleeve 206 and urged by a spring 207 in a direction to increase the valve opening, and a port 209 opened and closed by the spool 208.

The control mechanism 200 provides a speed change signal indicating a desired speed change ratio for the toroidal continuously variable transmission 102 corresponding to an angular position for the output shaft of the speed change motor 205, and adjusts the valve opening of the flow control valve mechanism 203 according to the tilt angle change $\phi_g$ mechanically measured by the tilt angle change measuring mechanism 204. Thus, the flow of the working fluid supplied to the hydraulic cylinder actuator 202 is adjusted to provide a power roller position signal. The position 214 of a piston 213 included in the hydraulic cylinder actuator 202 is displaced according to the change of the flow of the working fluid to adjust the power roller position.

FIG. 11 shows another control mechanism 300 proposed in JP-A No. 257686/2000.

The control mechanism 300 employs a position sensor, such as a linear variable differential transformer (abbreviated to "LVDT"), for measuring a tilt angle change $\phi_g$ in the tilt angle of a power roller 301. The control mechanism 300 controls the tilt angle of the power roller 301 on the basis of a data provided by the position sensor 302 in a feedback control mode. The position sensor 302 measures the position of a piston 304 included in a hydraulic cylinder actuator 303 for adjusting the position of the power roller 301 to determine a power roller position. The position sensor 302 gives measured power roller position data 305 to a position controller 306. Then, the position controller 306 generates a valve-opening signal 309 indicating a valve opening for a flow control valve mechanism 308 on the basis of the power roller position data 305 and a speed change signal 307. The flow of the working fluid supplied to the hydraulic cylinder actuator 303 is adjusted according to the valve-opening signal 309 to adjust the power roller position.

Thus, there have been proposed various control systems that measures the power roller position mechanically or electrically and controls the tilt angle of the power roller dominating the speed change ratio on the basis of the measured power roller position to improve the control characteristic of the speed change ratio control of a traction continuously variable transmission.

A method of mechanically measuring the tilt angle change in the tilt angle of the power roller, as mentioned in the description of the control mechanism 200 proposed in Japanese Pat. No. 2568684, requires the effect of machining errors in the dimensions of the components of the measuring mechanism, assembly errors in the measuring mechanism, and errors attributable to play and backlash between the component parts on the accuracy of measurement to be limited below a level that will adversely affect the accuracy of measurement. When a precise speed change ratio control is necessary, the dimensional accuracies of the component parts of the measuring mechanism must be raised, and the component parts need very difficult machining and assembling work.

Since the mechanical measuring mechanism is an assembly of many accurate component parts, the measuring mechanism becomes unavoidably large and heavy. Such a measuring mechanism is unsuitable for use on an aircraft and is inevitably costly. The performance of the mechanical measuring mechanism is greatly affected by the deterioration of the accuracy of the component parts with time. Increase in play and backlash between the component parts with time and deformation of the component parts deteriorate the accuracy of control and entails the deterioration of the stability and performance of the power generating system.

The control mechanism 300 proposed in JP-A No. 257686/2000 employing the highly accurate position sensor, such as a LVDT, for measuring the power roller position is inevitably large and heavy. The control mechanism 300 is difficult to install when the same is applied to an aircraft power generating system, and such a highly accurate position sensor is expensive and increases the costs of the control mechanism 300 unavoidably.

SUMMARY OF THE INVENTION

The present invention has been made in view of the foregoing problems and it is therefore an object of the present invention to provide a speed change control method and a speed change controller capable of maintaining a satisfactory control characteristic for an extended period of use and of enabling a continuously variable transmission mechanism including a traction continuously-variable transmission to be formed in small, lightweight construction and to be manufactured at low costs.

According to a first aspect of the present invention, a speed change control method of controlling a speed change ratio of a continuously variable transmission mechanism including a traction continuously variable transmission, comprises: estimating a tilt angle of a power roller included in the continuously variable transmission based on an input rotating speed and an output rotating speed of the continuously-variable transmission mechanism;

estimating a position of the power roller based on an estimated tilt angle obtained by the tilt angle estimating step and a command signal given to a driving device of adjusting the tilt angle of the power roller; and executing a feedback control operation based on an estimated position of the power roller obtained by the position estimating step.

Preferably, the speed change ratio of the continuously variable transmission mechanism is controlled so that the output rotating speed of the continuously variable transmission mechanism coincides with a predetermined rotating speed.

Preferably, the position of the power roller is estimated by an observer constituted using the tilt angle and a model of the driving device.

Preferably, the driving device includes a hydraulic cylinder actuator.

According to a second aspect of the present invention, a speed change controller for controlling a speed change ratio of a continuously variable transmission mechanism including a traction continuously variable transmission, comprises: a tilt angle estimating unit of estimating a tilt angle of a power roller included in the continuously variable transmission based on an input rotating speed and an output rotating speed of the continuously variable transmission mechanism; and a power roller position estimating unit of estimating a position of the power roller based on an estimated tilt angle estimated by the tilt angle estimating unit and a command signal given to a driving device of adjusting the tilt angle of the power roller, the position of the power roller estimated by the power roller position estimating unit being used to execute a feed back control operation.

Preferably, the speed change ratio of the continuously variable transmission mechanism is controlled so that the output rotating speed of the continuously variable transmission mechanism coincides with a predetermined rotating speed.

Preferably, the power roller position estimating unit includes an observer constituted using the tilt angle and a model of the driving device.

Preferably, the driving device includes a hydraulic cylinder actuator.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
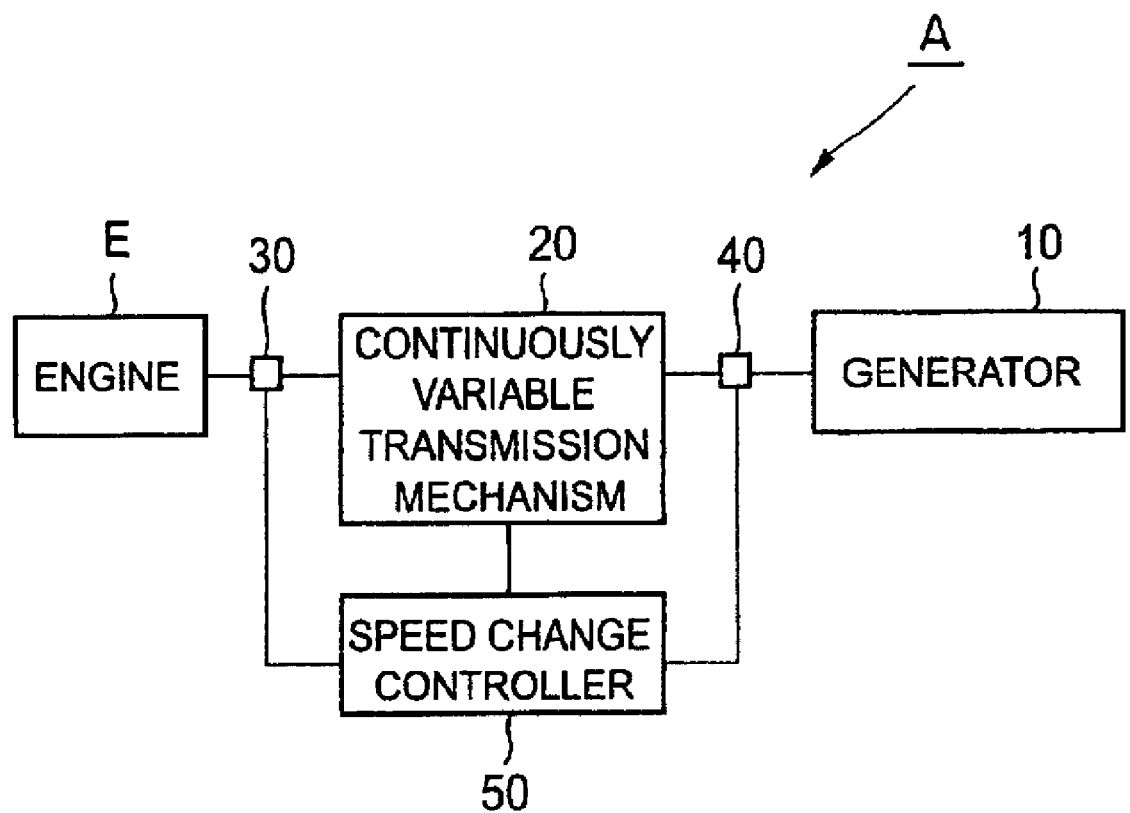
FIG. 1 is a block diagram of a power generating system including a speed change controller in a first embodiment according to the present invention.

FIG. 1 shows a power generating system A including a speed change controller 50 for carrying out a speed change control method in a preferred embodiment according to the present invention. The power generating system A produces an alternate current of a predetermined frequency by using the rotative output of, for example, the main engine of an aircraft.

The power generating system A includes, as principal components, a generator 10, a continuously variable transmission mechanism 20 which converts an input rotating speed of its input member, i.e., the rotating speed $N_1$ of the output member of an engine E (hereinafter referred to as "engine speed $N_1$"), into a predetermined output rotating speed, i.e., the rotating speed $N_2$ of the input member of the generator 10 (hereinafter referred to as "generator input speed $N_2$") and transmits the rotative power of the engine E to the generator 10, an engine speed sensor 30 for measuring the engine speed $N_1$, generator input speed sensor 40 for measuring the generator input speed $N_2$, and a speed change controller 50 for controlling the speed change ratio of the continuously variable transmission mechanism 20 on the basis of signals provided by the engine speed sensor 30 and the generator input speed sensor 40 so that the generator input speed $N_2$ coincides with a predetermined rotating speed.

The generator 10 generates power necessary for driving the electric equipment of the aircraft including a lighting system, an air conditioning system and an anti-icing system. The generator 10 is driven for rotation at a predetermined operating speed of, for example, 24,000 rpm to generate an alternate current of a predetermined frequency of, for example, 400 Hz. The generator 10 is of known construction and hence further description thereof will be omitted.

Figure 2:
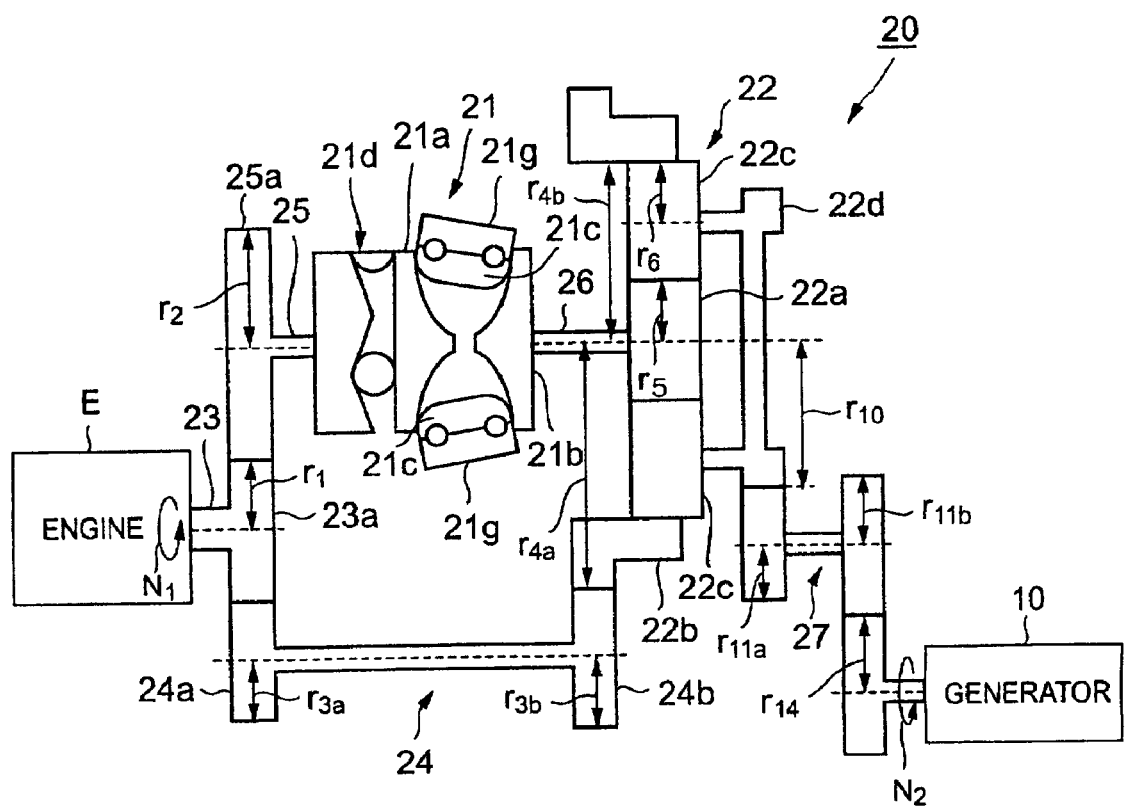
FIG. 2 is a typical view of a continuously variable transmission mechanism included in the power generating system shown in FIG. 1.

Referring to FIG. 2, the continuously variable transmission mechanism 20 includes a traction-drive toroidal continuously variable transmission (hereinafter referred to simply as "traction continuously variable transmission") 21, and a planetary gear 22. The continuously variable transmission mechanism 20 converts the engine speed $N_1$ in a predetermined range of, for example, 4,500 to 9,200 rpm into the predetermined operating speed to drive the generator 10 for operation at the predetermined operating speed. The continuously variable transmission mechanism 20 is a power-split transmission mechanism which does not transmits all the rotative driving force applied to its input shaft 23 through the traction continuously variable transmission 21 to the generator 10, but splits the input power and distributes power to the generator 10 and the planetary gear 22.

A gear 23a is mounted on the input shaft 23 of the continuously variable transmission mechanism 20, the traction continuously variable transmission 21 has a gear 25a mounted on its input shaft 25 and engaged with the gear 23a. Thus, the input shaft 25 of the traction continuously variable transmission 21 is interlocked with the input shaft 23 of the continuously variable transmission mechanism 20. Gears 24a and 24b are mounted on the opposite ends of an idle shaft 24, i.e., a power splitting shaft 24, respectively. The gear 24a is engaged with the gear 23a, and the gear 24b is engaged with a ring gear 22b included in the planetary gear 22. Thus, rotative driving force applied to the input shaft 23 of the continuously variable transmission mechanism 20 is distributed to the traction continuously variable transmission 21 and the planetary gear 22.

The traction continuously variable transmission 21 is of a half-toroidal type and has an input disk 21a mounted on the input shaft 25 for rotation together with the input shaft 25, an output disk 21b mounted on the output shaft 26 of the traction continuously variable transmission 21 for rotation together with the output shaft 26, a plurality of power rollers 21c held between the input disk 21a and the output disk 21b, and a thrust mechanism 21d for applying pressure to the power rollers 21c.

Figure 3:
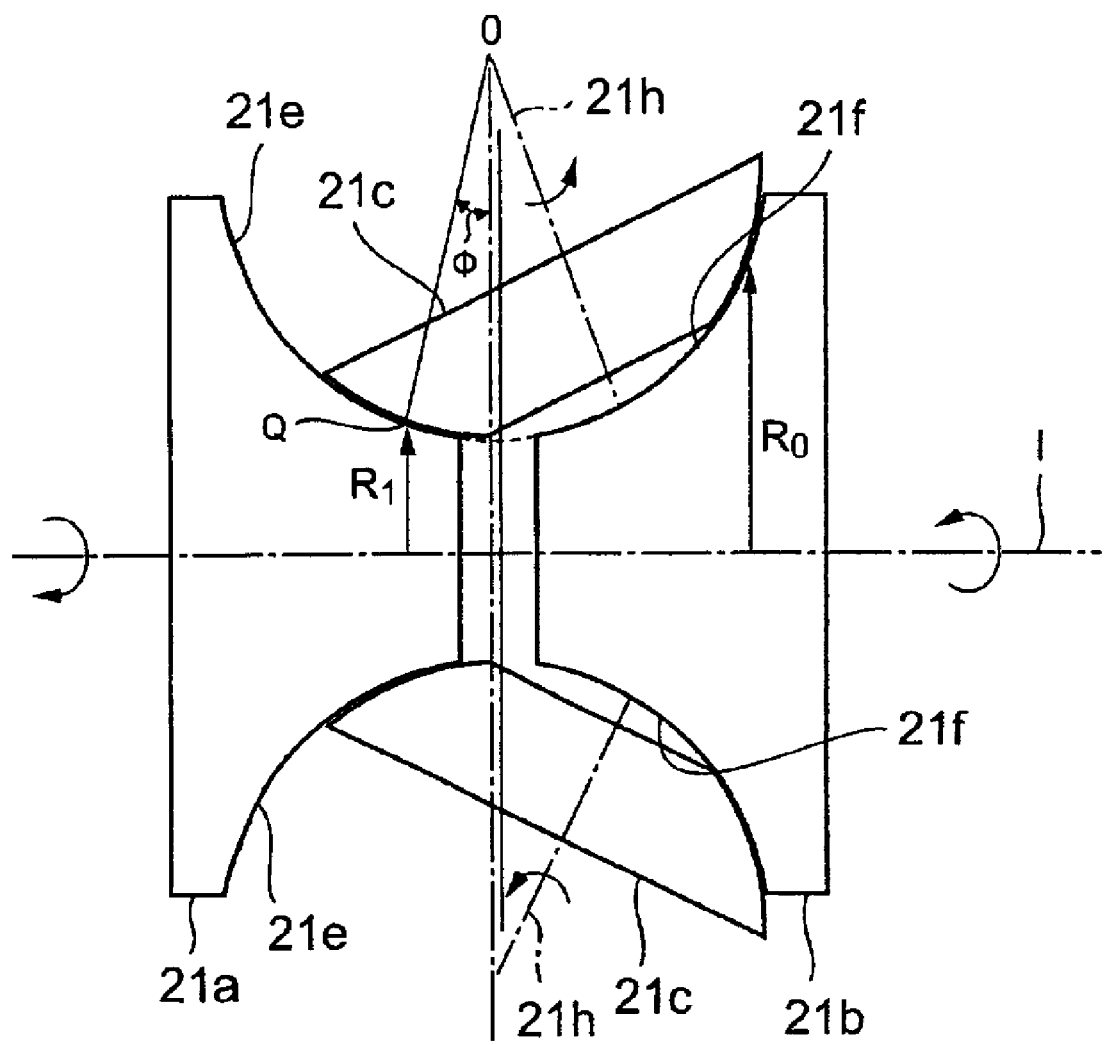
FIG. 3 is a typical view of a traction continuously variable transmission.

Referring to FIG. 3, the input disk 21a and the output disk 21b have friction surfaces 21e and 21f, respectively. The friction surfaces 21e and 21f have the shape of quadrants symmetrical with respect to the rotation axis I thereof in a plane including the rotation axis I.

Each power roller 21c is held between the input disk 21a and the output disk 21b by a thrust bearing 21g and support members, i.e., known trunnions, not shown, for rotation about its center axis 21h and for tilting in a plane including the center axes 21h and the rotation axis I.

The input disk 21a, the output disk 21b and the power rollers 21c, i.e., the rolling elements, are pressed together by high pressure. Power is transmitted from the input disk 21a through the power rollers 21c to the output disk 21b by the shearing resistance of a film of a high-viscosity oil formed between the contact surfaces of those rolling elements. The speed change ratio is changed in a predetermined range of, for example 0.5 to 2.0 by changing the tilt angle Φ of each power roller 21c, i.e., the angle between a segment OQ and a straight line R perpendicular to the center axis I of the disks 21a and 21b and passing a point O, where Q is a point of contact of the power roller 21c and the input disk 21a, and O is the center of a circle circumscribing the friction surface 21e of the power roller 21c.

Figure 4:
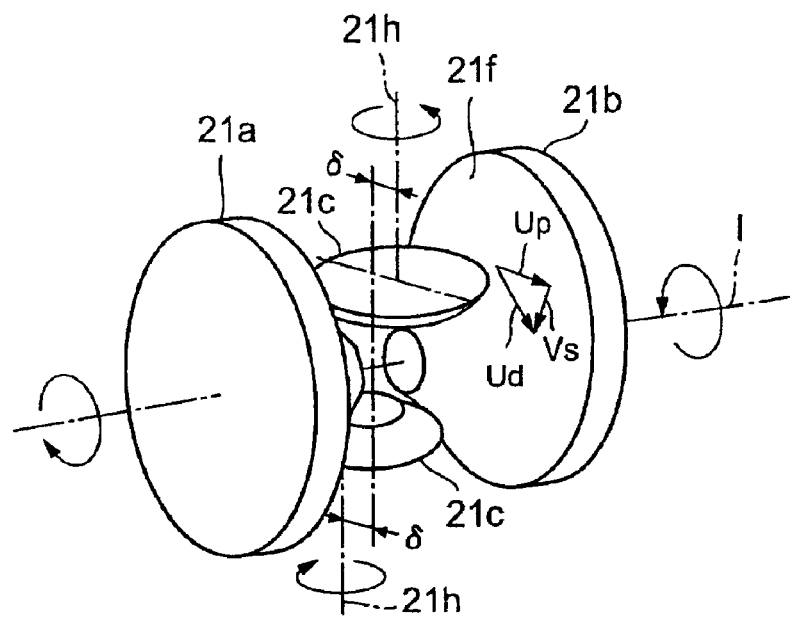
FIG. 4 is a typical perspective view of the traction continuously variable transmission.

A method of changing the tilt angle Φ will be explained. As shown in FIG. 4, when the rotation axis 21h of the power roller is dislocated by a distance x by an actuator 80, i.e., a driving device which, will be described later, the direction of a power roller velocity vector $U_p$ deviates from the direction of a disk velocity vector $U_d$ and a side slip vector $V_S$ is produced.

$$V_s = U_d - U_p \tag{1}$$

Consequently, the tilt angle Φ of the power roller 21c changes to reduce the side slip vector $V_s$ to zero. The length of projection of the piston rod 81 of the actuator 80, such as a hydraulic cylinder actuator, is adjusted properly to adjust the tilt angle Φ to a desired angle and thereby to set a desired speed change ratio. Thus, a desired speed change ratio control can be achieved by adjusting the tilt angle Φ to a desired angle by properly adjusting the position of the rotation axis 21h of the power roller 21 (hereinafter referred to as "power roller position").

If the tilt angle Φ is excessively large, the power rollers 21c spin excessively and, consequently, the toroidal continuously variable transmission 21 is unable to exercise a satisfactory power transmitting characteristic. Therefore the tilting of the power rollers 21c is limited by mechanical stoppers to permit the tilt angle Φ to change only in the predetermined range.

Suppose, as shown in FIG. 3, that $R_i$ is input working radius, i.e., the distance between the center axis I and the point of contact between the input disk 21a and the power roller 21c, $R_o$ is output working radius, i.e., the distance between the center axis I and the point of contact between the output disk 21b and the power roller 31c, $N_i$ is the rotating speed of the input shaft and the input disk 21a, $N_o$ is the rotating speed of the output shaft and the output disk 21$b$, and $R_{CVT}$ is the speed change ratio. Then, $$R_{CVT}=N_o/N_i=R_i/R_o$$

Thus, the working radii $R_i$ and $R_o$ can be continuously changed by controlling the tilt angle $\Phi$ of each power roller 21$c$ and, consequently, the speed change ratio $N_o/N_i$ can be continuously changed. Since the speed change ratio $R_{CVT}$ is dependent on the ratio, $R_i/R_o$, the speed change ratio can be continuously changed by changing the tilt angle $\Phi$ of the power rollers 21$c$.

The planetary gear 22 includes the ring gear 22$b$ interlocked, as mentioned above, with the input shaft 23 of the continuously variable transmission mechanism 20 through the idle shaft (power splitting shaft) 24, a sun gear 22$a$ fixedly mounted on or formed integrally with the output shaft 26 of the traction continuously variable transmission 21, a plurality of planet pinions 22$c$ interposed between the sun gear 22$a$ and the ring gear 22$b$, and a carrier 22$d$ supporting the planet pinions 22$c$ for rotation and capable of rotating about the axis of the sun gear 22$a$ as the planet pinions 22$c$ revolve about the axis of the sun gear 22$a$.

Since the planet pinions 22$c$ are supported for rotation on the carrier 22$d$, and the sun gear 22$a$ and the ring gear 22$b$ are rotatable, the planetary gear 22 has two degrees of freedom of motion, and the planetary gear 22 is interlocked with the idle shaft (power splitting shaft) 24. Thus, the rotative driving force for driving the generator 10 can be distributed to the traction continuously variable transmission 21 and the power splitting shaft 24.

The rotating speed of the carrier 22$d$ can be fixed at, for example, 6255 rpm by varying the rotating speed of the sun gear 22$a$ by the traction continuously variable transmission 21 according to the variation of the rotating speed of the input shaft 23 equal to the engine speed $N_1$. The rotating speed of the carrier 22$d$ is increased by a gear train 27 to drive the generator 10 for operation at a fixed operating speed of, for example, 24,000 rpm.

Thus, the rotative driving force for driving the generator 10 is transmitted through both the traction continuously variable transmission 21 and the planetary gear 22 instead of transmitting the same only through the traction continuously variable transmission 21 to the generator 10. Consequently, the life of the traction continuously variable transmission 21 can be extended, and the traction continuously-variable transmission 21 can be formed in small, lightweight construction. Generally, the continuously variable transmission has a comparatively low power transmission capacity. However, the upper limit of power that can be transmitted by the continuously variable transmission mechanism 20 can be readily raised by distributing the rotative driving force of the engine E to the power splitting shaft 24 and the traction continuously variable transmission 21. Since the planetary gear 22 operates at an efficiency not lower than 99%, the power transmission efficiency of the continuously variable transmission mechanism 20 is as high as about 95%.

The engine seed sensor 30 and the generator input speed sensor 40 will be described.

Each of the engine speed sensor 30 and the generator input speed sensor 40 is, for example, a combination of a pulse generator, not shown, and a pulse counter, not shown. The engine speed $N_1$ and the generator input speed $N_2$ are determined by counting pulses generated by the pulse generators by the pulse counters, respectively. The engine speed sensor 30 and the generator input speed sensor 40 provide signals indicating a measured engine speed $N_1$ and a measured generator input speed $N_2$, respectively.

Figure 5:
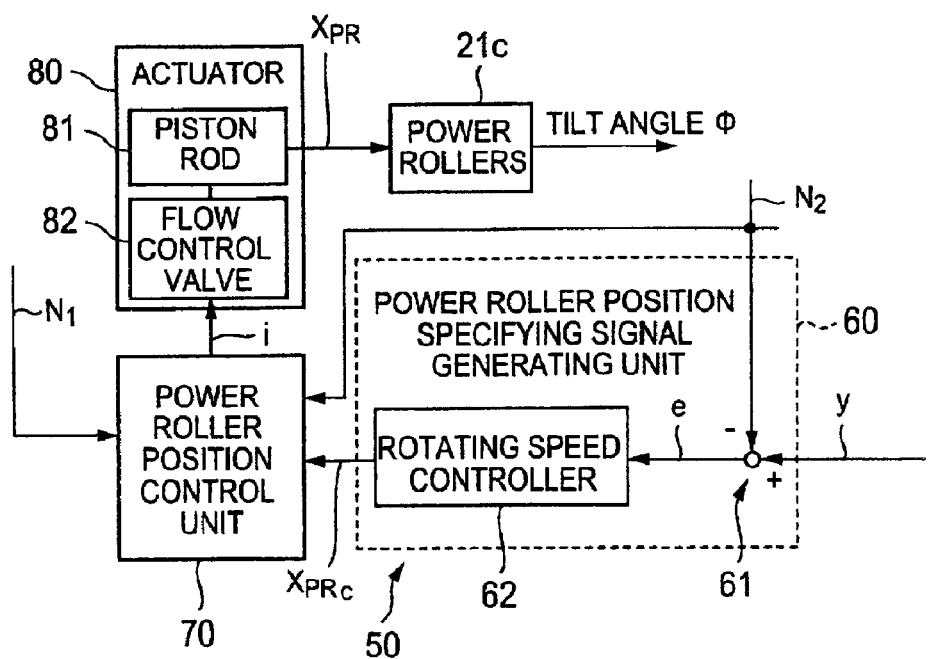
FIG. 5 is a block diagram of a speed change controller.

Referring to FIG. 5, the speed change controller 50 has a unit 60 of generating a signal specifying a power roller position and a power roller position control unit 70.

The unit 60 has a subtractor 61 which subtracts a measured generator input speed from a specified generator input speed y, i.e., a desired value of the generator input speed $N_2$, and provides a rotating speed difference signal indicating the rotating speed difference e, and a rotating speed controller 62 which generates a power roller position specifying signal $x_{PRc}$ indicating a power roller position that reduces the rotating speed difference signal to zero.

The power roller position control unit 70 generates an actuator operating signal i, i.e., a control signal for controlling the actuator 80, on the basis of the power roller position specifying signal $x_{PRc}$ received from the rotating speed controller 62, the measured engine speed $N_1$ and the measured generator input speed $N_2$ to control the actuator 80.

The position of the piston rod 81 of the actuator 80, i.e., a hydraulic cylinder actuator, is controllable by adjusting the opening of a flow control valve 82 for controlling the flow of the working fluid supplied to the cylinder of the actuator 80. The actuator operating signal i specifies an opening of the flow control valve 82 such that the an estimated power roller position $^Y x_{PR}$ calculated by a method which will be described later coincides with a position indicated by the power roller position signal $x_{PRc}$.

Figure 6:
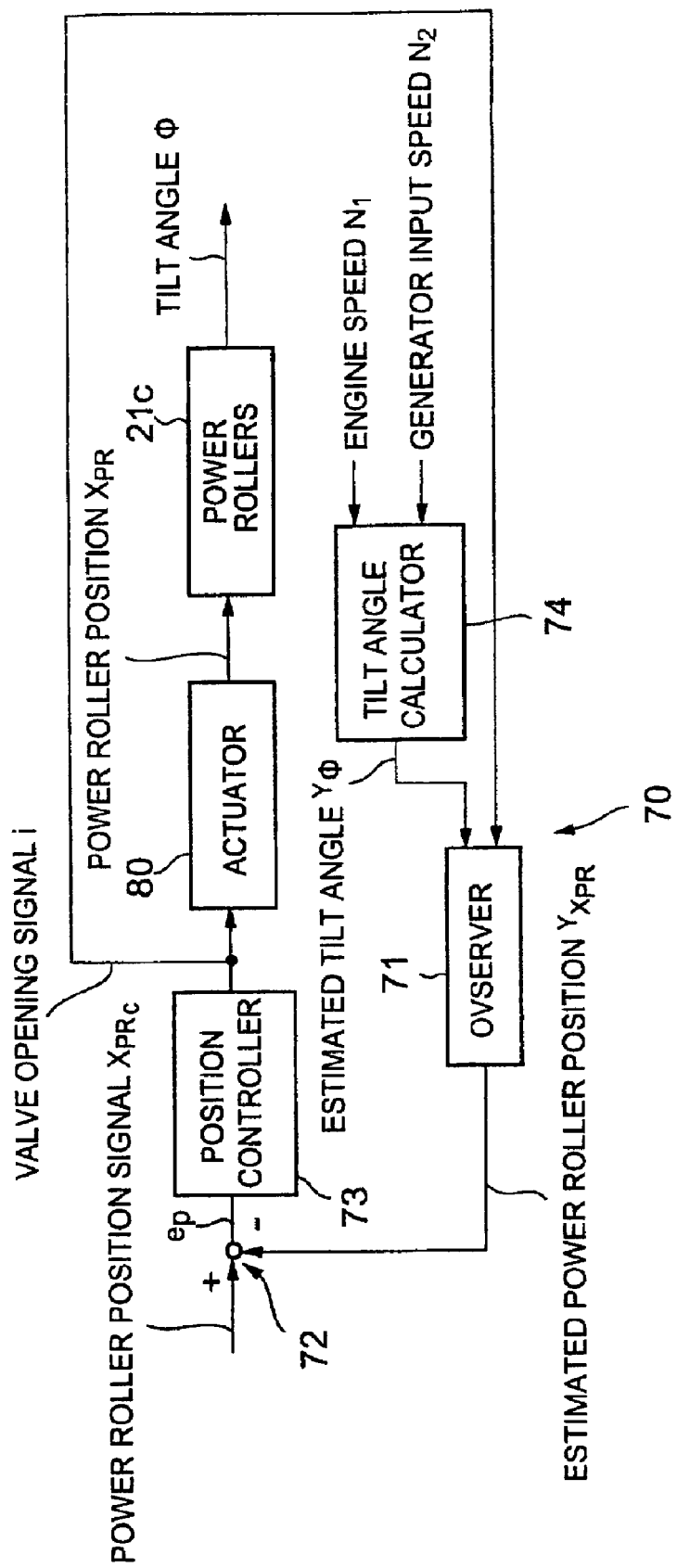
FIG. 6 is a block diagram of a power roller position control unit.

Referring to FIG. 6, the power roller position control unit 70 has an observer 71 which carries out a predetermined power roller position estimating process to estimate a power roller position and provides a signal indicating the estimated power roller position $^Y x_{PR}$, a subtractor 72 which subtracts the estimated power roller position $^Y x_{PR}$ from the power position specifying signal $x_{PRc}$ to obtain a position difference $e_P$, and provides a signal indicating the position difference $e_P$, a position controller 73 which provides a valve opening specifying signal i to reduce the position difference $e_P$ to zero, and a tilt angle calculator 74 which carries out a predetermined tilt angle estimating process to estimate the tilt angle of the power rollers 21$c$ and provides an estimated tilt angle $^Y\Phi$. The symbol $^Y x_{PR}$ indicates an estimated value of $x_{PR}$, and a symbol $^Y\Phi$ indicates an estimated value of $\Phi$.

The power roller position estimating process to be carried out by the observer 71 will be explained.

Control characteristics of control of tilt angle $\Phi$ and power roller position $X_{PR}$ is represented by mathematical models represented by Expressions (2) and (3)

$$\Phi=(K_2/s(1+T_2s))X_{PR} \qquad (2)$$

$$X_{PR}=(K_1/s)i \qquad (3)$$

where $K_1$ and $K_2$ are proportional gains, $T_2$ is time constant and s is Laplace operator. From Expressions (2) and (3), a design model of the observer 71 is represented by Expression (4)

$$X_{PR}\approx(K/s^2)i \qquad (4)$$

where $K=K_1 \cdot K_2$ and $T_2 \approx 0$.

Space state matrices A and B are divided as represented by Expressions (5), (6) and (7).

$$dx/dt=A+Bi \qquad (5)$$

$$X_{PR}=Cx \qquad (6)$$

$$\{A, B, C\} = \left\{ \begin{bmatrix} 0 & K_1 \\ 0 & 0 \end{bmatrix}, \begin{bmatrix} 0 \\ K_2 \end{bmatrix}, [1\ 0] \right\} \quad (7)$$

In Expressions (5) and (6), x is space variable. In Symbols A and B in Expressions (5), (6) and (7) are expressed by Expressions (8) and (9).

$$A := \begin{bmatrix} A_{11} & A_{12} \\ A_{21} & A_{22} \end{bmatrix} \quad (8)$$

$$B := \begin{bmatrix} B_1 \\ B_2 \end{bmatrix} \quad (9)$$

Thus, $A_{11}=A_{21}=A_{22}=B_1=0$, $A_{12}=K_1$ and $B_2=K_2$. A design parameter L is adjusted so that a pole of the observer, i.e., the characteristic value of estimated matrix $^Y A$ represented by Expression (10) is stabilized.

$$^Y A = A_{22} - L A_{12} \quad (10)$$

Matrices $^Y B$, G, $^Y C$ and $^Y D$ can be represented by Expressions (11), (12), (13) and (14) by using a matrix L.

$$^Y B = -L B_1 + B_2 \quad (11)$$

$$G = {^Y A} L + A_{21} - L A_{21} \quad (12)$$

$$^Y C := \begin{bmatrix} 0 \\ 1 \end{bmatrix} \quad (13)$$

$$^Y D = \begin{bmatrix} 1 \\ L \end{bmatrix} \quad (14)$$

Thus, the observer 71 can be designed as a minimum dimension observer represented by Expressions (15) and (16) from the models of tilt angle $\Phi$ and power roller position $X_{PR}$.

$$d\omega/dt = {^Y A}\omega + {^Y B}i + G^Y\Phi \quad (15)$$

$$^Y X_{PR} = {^Y C}\omega + {^Y D}{^Y \Phi} \quad (16)$$

where $\omega$ indicates the state of the minimum dimension observer.

The speed change ratio $e_s$ of the continuously variable transmission mechanism 20 is expressed by Expression (17).

$$e_s \approx \frac{r_2}{r_5} \left\{ \frac{2 r_{14} r_{11a}(r_5 + r_6)}{r_{11b} r_{10} r_1} \cdot \frac{N_2}{N_1} - \frac{r_{4b} r_{3b}}{r_{4a} r_{3a}} \right\} \quad (17)$$

where $r_1$ to $r_{14}$ are the radii of the respective pitch circles of gears. Therefore, the estimated tilt angle $^Y \Phi$ can be calculated by using Expressions (18), (19) and (20).

$$Y_\Phi = -\alpha + \arcsin\left\{ \frac{(1+k_0)(e_s - 1)}{R} \right\} \quad (18)$$

$$\alpha = \arctan\left( \frac{e_s \cos 2\theta_0 - 1}{e_s \sin 2\theta_0} \right) \quad (19)$$

$$R = \sqrt{(e_s \sin 2\theta_0)^2 + (e_s \cos 2\theta_0 - 1)^2} \quad (20)$$

where $\theta_0$ is power roller half vertex angle, and $k_0$ is cavity aspect ratio.

In the speed change controller in this embodiment, the tilt angle calculator 74 calculates the estimated tilt angle $^Y \Phi$ on the basis of the engine speed $N_1$ and the generator input speed $N_2$, the observer 71 estimates the power roller position on the basis of the estimated tilt angle $^Y \Phi$ and the valve opening signal i, i.e., an input control signal. Thus, the speed change controller is capable of accurate speed change ratio control without requiring any position measuring mechanism, such as a position sensor.

Therefore, number of component parts of the continuously variable transmission mechanism and the speed change controller of, for example, an airborne power generating system can be remarkably reduced, the power generating system can be constructed in small, lightweight construction, work for the maintenance of the power generating system is facilitated, and the power generating system can be manufactured at low costs.

Since the design and adjustment of the observer is very easy, and the noise eliminating effect of the observer can be expected, a system having a control characteristic not subject to the effect of disturbance can be constructed.

FIGS. 7A to 7C and FIGS. 8A to 8C are graphs comparatively showing the respective characteristics of the speed change controller employing the observer 71, and a speed change controller employing a position sensor as a related art.

Figure 7A:
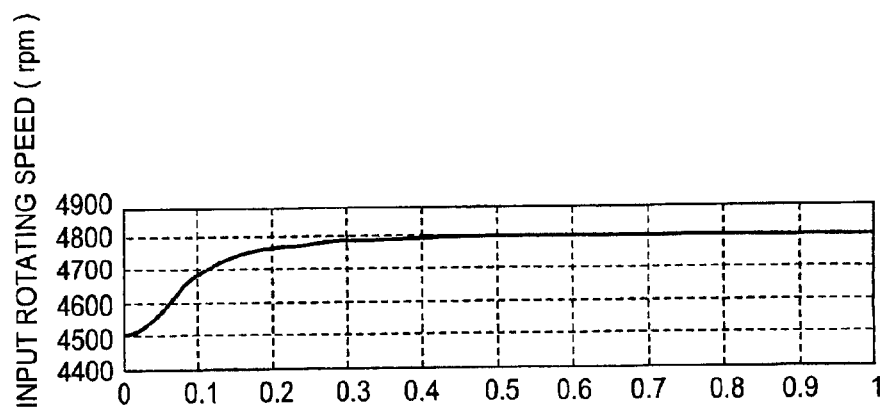
FIGS. 7A, 7B and 7C are graphs showing the variation of input rotating speed with time, the variation of output rotating speed with time and the variation of power roller position with time, respectively, when an observer is used.
Figure 7B:
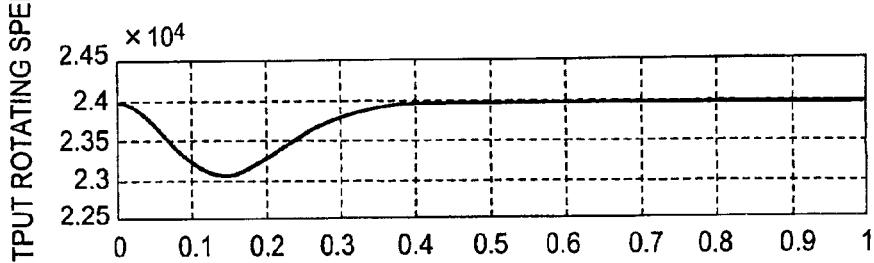
Figure 7C:
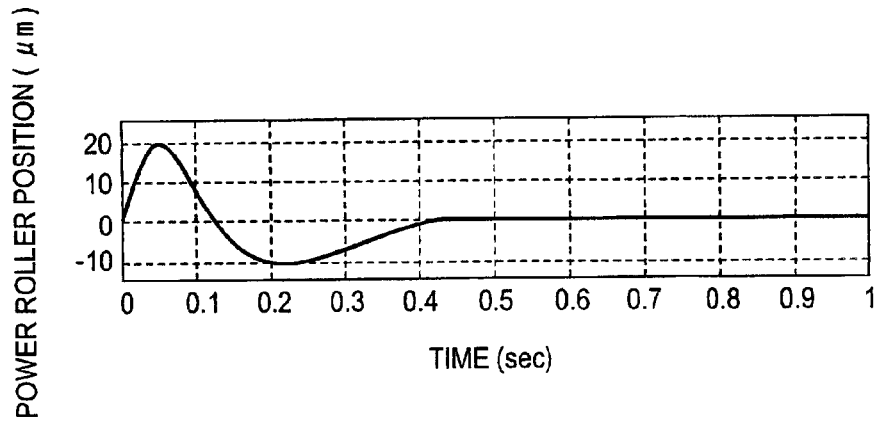

FIGS. 7A, 7B and 7C are graphs showing the variation of the input rotating speed of the continuously variable transmission mechanism 20, i.e., engine speed $N_1$, with time, the variation of the output rotating speed of the continuously variable transmission, i.e., the generator input speed $N_2$, with time and the variation of power roller position with time, respectively, when the continuously variable transmission mechanism 20 is controlled by a speed change controller using the estimated power roller position $^Y X_{PR}$ determined by the observer 71. The engine speed $N_1$ is measured on the vertical axis and time is measured on the horizontal axis in FIG. 7A, the generator input speed $N_2$ is measured on the vertical axis and time is measured on the horizontal axis in FIG. 7B, and the measured power roller position is measured on the vertical axis and time is measured on the horizontal axis in FIG. 7C.

Figure 8A:
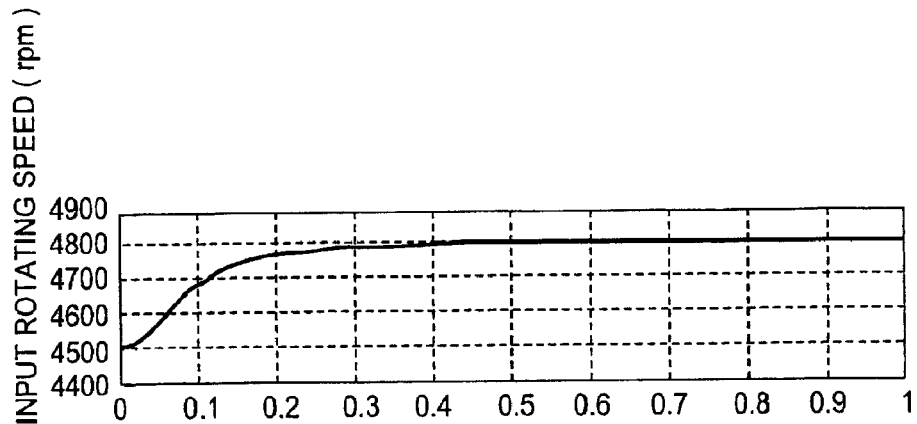
FIGS. 8A, 8B and 8C are graphs showing the variation of input rotating speed with time, the variation of output rotating speed with time and the variation of power roller position with time, respectively, when a position sensor as a related art is used.
Figure 8B:
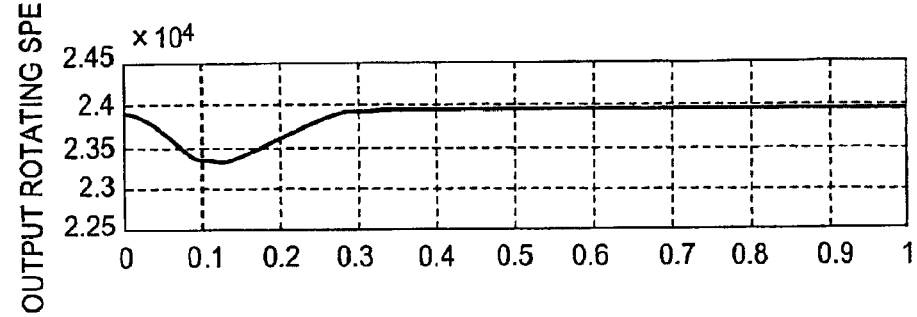
Figure 8C:
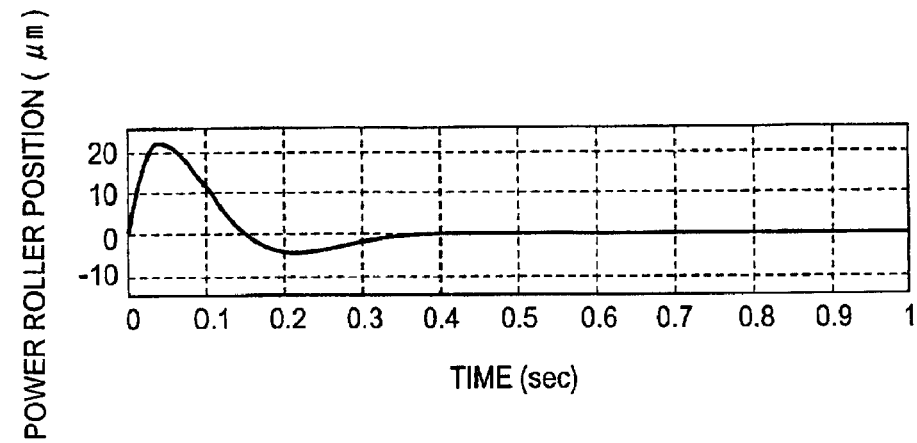
Figure 9:
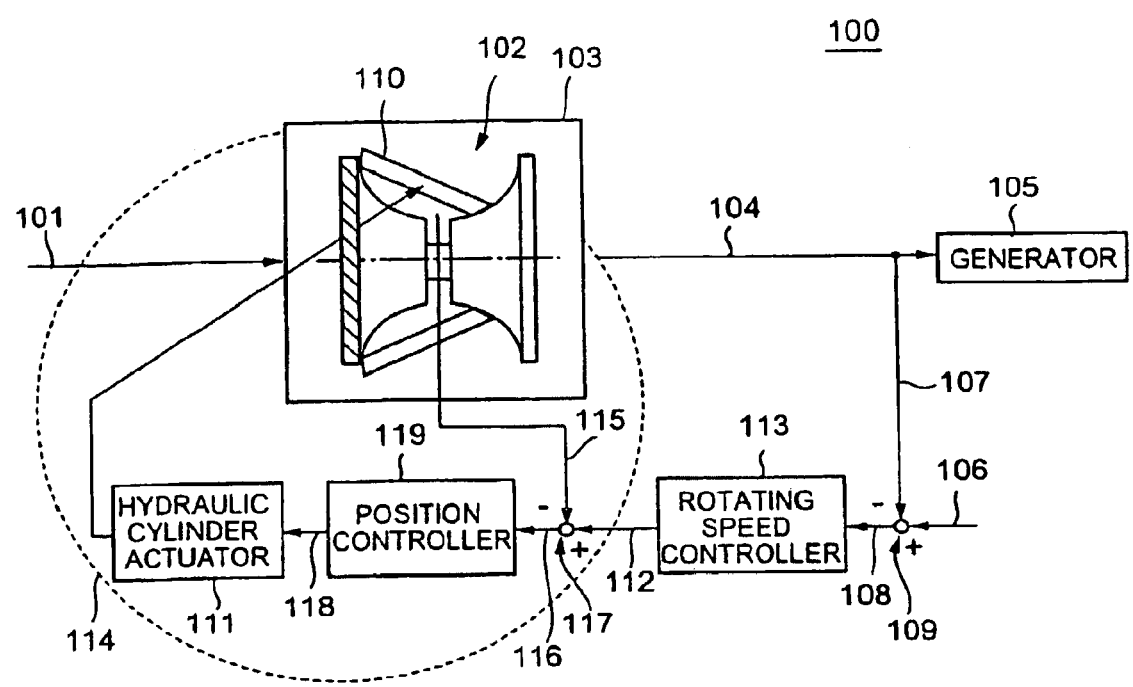
FIG. 9 is a typical view of assistance in explaining the basic conception of speed change ratio control for controlling a traction continuously variable transmission.
Figure 10:
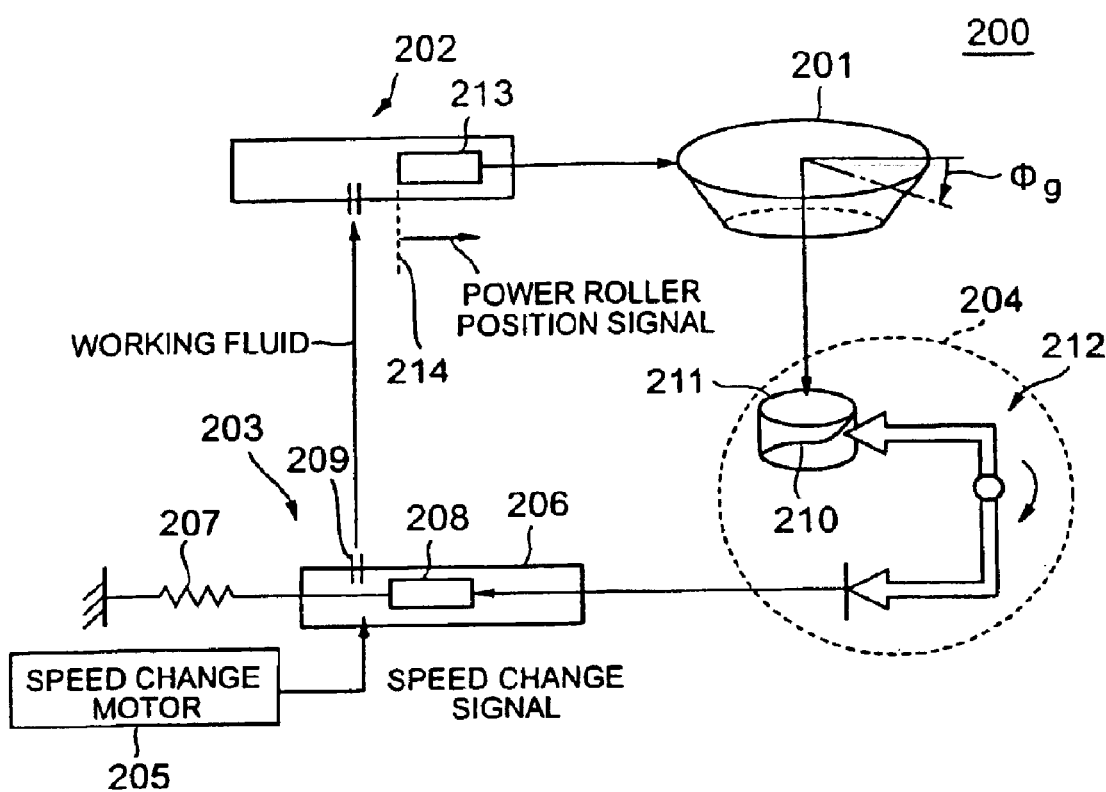
FIG. 10 is a typical view of a control mechanism as a related art.
Figure 11:
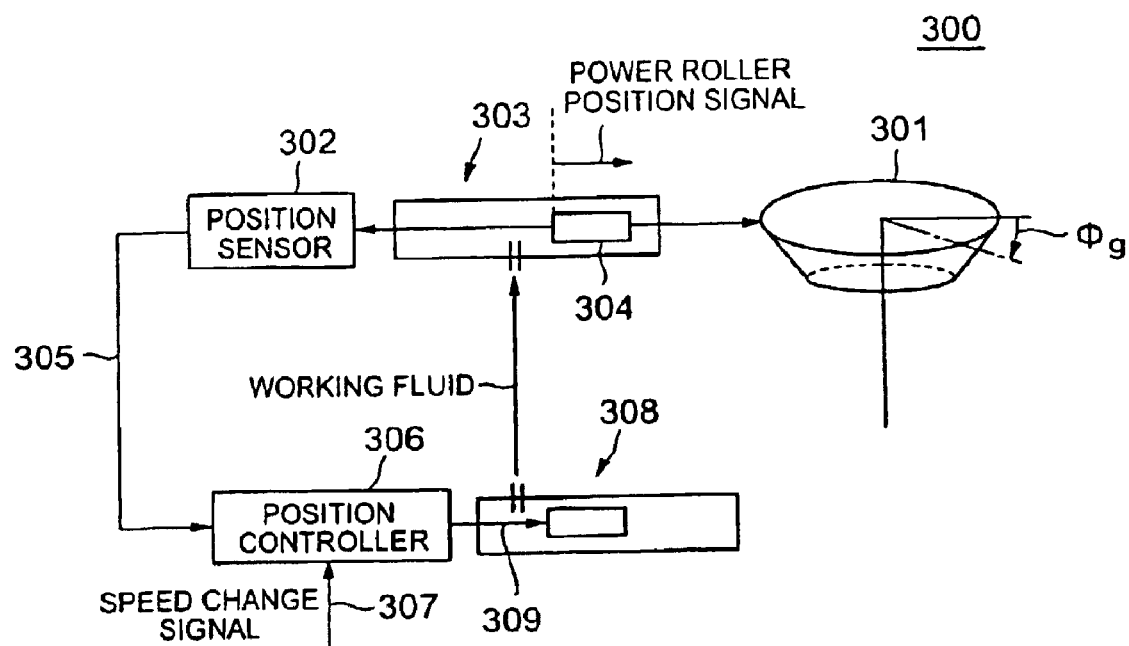
FIG. 11 is a typical view of another control mechanism as a related art.

FIGS. 8A, 8B and 8C are graphs showing the variation of the input rotating speed of the continuously variable transmission mechanism 20, i.e., engine speed $N_1$, with time, the variation of the output rotating speed of the continuously variable transmission, i.e., the generator input speed $N_2$, with time and the variation of power roller position with time, respectively, when the continuously variable transmission mechanism 20 is controlled by a speed change controller using the measured power roller position measured by a position sensor as a related art. The engine speed $N_1$ is measured on the vertical axis and time is measured on the horizontal axis in FIG. 8A, the generator input speed $N_2$ is measured on the vertical axis and time is measured on the horizontal axis in FIG. 8B, and the measured power roller position is measured on the vertical axis and time is measured on the horizontal axis in FIG. 8C.

As obvious from the comparative observation of FIGS. 7 and 8, the ability of the speed change controller using the observer is substantially equal to that of the speed change controller using the position sensor.

Although the preferred embodiment of the present invention has been described, the observer 71 may be an all-dimension observer or a nonlinear observer (Japanese. Pat. App. No. 075566/2000) instead of the minimum-dimension observer. The use of a minimum-dimension observer reduces the number of parameters necessary for adjustment and facilitates adjustment.

Naturally, the speed change controller of the present invention is applicable not only to the half-toroidal continuously variable transmission, but also to any continuously variable transmissions that are expected to be satisfactorily controlled by employing an observer.

As apparent form the foregoing description, the speed change controller according to the embodiment of the present invention estimates the tilt angle of the power rollers on the basis of the input and the output rotating speed of the continuously-variable transmission mechanism, estimates the power roller position on the basis of the estimated tilt angle and the signal given to the driving device for driving the power rollers, and controls the tilt angle of the power rollers on the basis of the estimated power roller position in a feedback control mode. Therefore, accurate speed change ratio control can be achieved without using any position sensor for measuring the power roller position in a high accuracy substantially the same as that in which a speed change controller using a position sensor can achieve speed change ratio control. The system including the continuously variable transmission mechanism and the speed change controller can be formed in small, lightweight construction and can be manufactured at low costs.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A speed change control method of controlling a speed change ratio of a continuously variable transmission mechanism including a traction continuously variable transmission, comprising:

estimating a tilt angle of a power roller included in the continuously variable transmission based on an input rotating speed and an output rotating speed of the continuously-variable transmission mechanism;

estimating a position of the power roller based on an estimated tilt angle obtained by the tilt angle estimating step and a command signal given to a driving device of adjusting the tilt angle of the power roller; and executing a feedback control operation based on an estimated position of the power roller obtained by the position estimating step.

2. The speed change control method according to claim 1, wherein the speed change ratio of the continuously variable transmission mechanism is controlled so that the output rotating speed of the continuously variable transmission mechanism coincides with a predetermined rotating speed.

3. The speed change control method according to claim 2, wherein the position of the power roller is estimated by an observer constituted using the tilt angle and a model of the driving device.

4. The speed change control method according to claim 3, wherein the driving device includes a hydraulic cylinder actuator.

5. The speed change control method according to claim 1, wherein the position of the power roller is estimated by an observer constituted using the tilt angle and a model of the driving device.

6. The speed change control method according to claim 5, wherein the driving device includes a hydraulic cylinder actuator.

7. A speed change controller for controlling a speed change ratio of a continuously variable transmission mechanism including a traction continuously variable transmission, comprising:

a tilt angle estimating unit of estimating a tilt angle of a power roller included in the continuously variable transmission based on an input rotating speed and an output rotating speed of the continuously variable transmission mechanism; and a power roller position estimating unit of estimating a position of the power roller based on an estimated tilt angle estimated by the tilt angle estimating unit and a command signal given to a driving device of adjusting the tilt angle of the power roller, the position of the power roller estimated by the power roller position estimating unit being used to execute a feed back control operation.

8. The speed change controller according to claim 7, wherein the speed change ratio of the continuously variable transmission mechanism is controlled so that the output rotating speed of the continuously variable transmission mechanism coincides with a predetermined rotating speed.

9. The speed change controller according to claim 8, wherein the power roller position estimating unit includes an observer constituted using the tilt angle and a model of the driving device.

10. The speed change controller according to claim 9, wherein the driving device includes a hydraulic cylinder actuator.

11. The speed change controller according to claim 7, wherein the power roller position estimating unit includes an observer constituted using the tilt angle and a model of the driving device.

12. The speed change controller according to claim 11, wherein the driving device includes a hydraulic cylinder actuator.

* * * * *